US008381466B2

(12) United States Patent
Ehbing et al.

(10) Patent No.: US 8,381,466 B2
(45) Date of Patent: Feb. 26, 2013

(54) PHOTOVOLTAIC SOLAR MODULE HAVING A POLYURETHANE FRAME

(75) Inventors: Hubert Ehbing, Odenthal (DE); Frank Schauseil, Leverkusen (DE); Andreas Hoffmann, Köln (DE); Daniel Seidlitz, Rösrath (DE)

(73) Assignee: Bayer MaterialScience AG, Leverkusen (DE)

( * ) Notice: Subject to any disclaimer, the term of this patent is extended or adjusted under 35 U.S.C. 154(b) by 368 days.

(21) Appl. No.: 12/936,308

(22) PCT Filed: Mar. 24, 2009

(86) PCT No.: PCT/EP2009/002132
§ 371 (c)(1),
(2), (4) Date: Oct. 4, 2010

(87) PCT Pub. No.: WO2009/121502
PCT Pub. Date: Oct. 8, 2009

(65) Prior Publication Data
US 2011/0030767 A1 Feb. 10, 2011

(30) Foreign Application Priority Data

Apr. 4, 2008 (DE) .......................... 10 2008 017 621
Aug. 14, 2008 (DE) .......................... 10 2008 037 814

(51) Int. Cl.
*H01L 31/042* (2006.01)
*H01L 31/048* (2006.01)

(52) U.S. Cl. ....................................... 52/173.3; 136/251
(58) Field of Classification Search .................. 52/173.3; 136/251
See application file for complete search history.

(56) References Cited

U.S. PATENT DOCUMENTS

| | | | |
|---|---|---|---|
| 3,360,495 A | | 12/1967 | Muller et al. |
| 3,383,351 A | | 5/1968 | Stamberger |
| 4,695,420 A | * | 9/1987 | Grawey et al. ................ 264/265 |
| 4,830,038 A | | 5/1989 | Anderson et al. |
| 5,008,062 A | | 4/1991 | Anderson et al. |
| 5,200,355 A | | 4/1993 | Choi et al. |
| 5,567,763 A | | 10/1996 | Madan et al. |
| 5,733,382 A | * | 3/1998 | Hanoka .......................... 136/251 |
| 5,741,370 A | * | 4/1998 | Hanoka .......................... 136/251 |
| 5,762,720 A | * | 6/1998 | Hanoka et al. ................. 136/251 |
| 5,986,203 A | * | 11/1999 | Hanoka et al. ................. 136/251 |
| 7,049,803 B2 | | 5/2006 | Dorner et al. |
| 8,225,560 B2 | * | 7/2012 | Valentz et al. .................. 52/200 |
| 8,291,674 B2 | * | 10/2012 | Valentz et al. ................ 52/742.1 |
| 2003/0075210 A1 | | 4/2003 | Stollwerck et al. |
| 2006/0225776 A1 | * | 10/2006 | Nemazi et al. ................. 136/244 |
| 2007/0084501 A1 | | 4/2007 | Kalberlah et al. |
| 2007/0131274 A1 | | 6/2007 | Stollwerck et al. |
| 2011/0155222 A1 | * | 6/2011 | Ehbing et al. .................. 136/251 |
| 2012/0186631 A1 | * | 7/2012 | Terreau et al. .................. 136/251 |

FOREIGN PATENT DOCUMENTS

| | | |
|---|---|---|
| DE | 1168075 B | 4/1964 |
| DE | 3513910 A1 | 10/1986 |
| DE | 3737183 A1 | 5/1989 |
| DE | 3821908 A1 | 1/1990 |
| DE | 4140681 A1 | 6/1992 |
| DE | 4140682 A1 | 6/1993 |
| DE | 10101770 A1 | 7/2002 |
| DE | 102005032716 A1 | 1/2007 |
| DE | 102005058014 A1 | 1/2007 |
| EP | 1225642 A1 | 7/2002 |
| EP | 1302988 A2 | 4/2003 |
| EP | 1818347 A1 | 8/2007 |
| JP | 2001-135848 A | 5/2001 |
| JP | 2006-175764 A | 7/2006 |

OTHER PUBLICATIONS

American Urethane, Inc. Polyurethan Properties, 3 pages found www.americanurethan.com/polyurethan-properties, copyright 2010, printed Nov. 30, 2012.*

Kandil, S.H., et al., "Thermal behavior of polyurethane for use in solar cell encapsulation," Solar Energy Materials, 1989, vol. 19, pp. 211-219.

* cited by examiner

*Primary Examiner* — Robert Canfield
(74) *Attorney, Agent, or Firm* — Novak Druce Connolly Bove + Quigg LLP

(57) ABSTRACT

The present invention relates to a photovoltaic solar module, a process for the preparation thereof, and a device for generating electric energy employing such a solar module. The photovoltaic solar module has a wholly or partly surrounding frame of polyurethane which is characterized in that said frame has an elongation at break of at least 50%, a modulus of elasticity of at least 30 N/mm$^2$ and a coefficient of thermal expansion of up to $\alpha=80\times10^{-6}$/K, the modulus of elasticity and the coefficient of thermal expansion each being measured parallel to the edges of the module.

25 Claims, No Drawings

PHOTOVOLTAIC SOLAR MODULE HAVING A POLYURETHANE FRAME

PRIORITY

Priority is claimed as a national stage application, under 35 U.S.C. §371, to PCT/EP2009/002132, filed Mar. 24, 2010, which claims priority to German patent application 102008017621.4, filed Apr. 4, 2008 and to German patent application 102008037814.3, filed Aug. 14, 2008. The disclosures of the aforementioned priority applications are incorporated herein by reference in their entirety.

BACKGROUND OF THE INVENTION

1. Field of the Invention

The field of the present invention relates to a photovoltaic solar module, a process for the preparation thereof, and a device for generating electric energy employing such a solar module.

2. Background

Solar modules are construction elements for the direct generation of electricity from sunlight. Key factors for a cost-efficient generation of solar electricity include the efficiency of the solar cells employed as well as the production cost and durability of the solar modules.

A solar module usually consists of a framed composite of glass, interconnected solar cells, an encapsulation material and a backside construction. The individual layers of the solar module serve the following functions.

The front glass serves for protection from mechanical impact and the effects of the weather. It must have an excellent transparency in order to keep absorption losses in the optical spectral range of from 300 nm to 1150 nm and thus efficiency losses of the silicon solar cells, which are usually employed for power generation, as low as possible. Normally, tempered low-iron white glass (3 or 4 mm thick), whose transmittance in the above spectral range is around 90 to 92%, is used.

The encapsulating material (mostly EVA (ethylene-vinyl acetate) sheets are used) serves for adhesively bonding the whole module assembly. During a lamination process, EVA melts at about 150° C., flows into the spaces of the soldered solar cells and is thermally cross-linked. The formation of air bubbles, which would result in reflection losses, is avoided by lamination under vacuum.

The backside of the module protects the solar cells and the encapsulating material from moisture and oxygen. In addition, it serves as a mechanical protection from scratch etc. when the solar modules are mounted, and as an electrical isolation. Another sheet of glass or a composite sheet can be employed as the backside construction. Mostly, the variants PVF(polyvinyl fluoride)-PET(polyethylene tere-phthalate)-PVF or PVF-aluminum-PVF are employed.

In particular, the encapsulating materials employed in solar module construction must have good barrier properties against humidity and oxygen. Humidity and oxygen do not attack the solar cells themselves, but corrosion of the metal contacts and chemical degradation of the EVA encapsulating material occur. A destroyed solar cell contact leads to complete failure of the module since normally all solar cells in one module are electrically serially connected. A degradation of the EVA can be seen from a yellowing of the module associated with a corresponding performance reduction by light absorption and visual deterioration. Today, about 80% of all modules are encapsulated on the backside with one of the composite sheets described, and glass is used for the front and back sides of about 15% of the solar modules. In this case, in part highly transparent casting resins, which cure slowly, however (several hours), are employed as encapsulating material instead of EVA.

In order to achieve competitive electricity generation costs of solar electricity despite the relatively high investment cost, solar modules must reach long service lives. Therefore, solar modules are designed for a service life of 20 to 30 years today. In addition to a high weather stability, high demands are placed on the temperature resistance of the modules, whose temperature can vary cyclically during operation from 80° C. under full solar irradiation to temperatures below the freezing point. Accordingly, solar modules are subjected to extensive stability tests (standard tests according to IEC 61215 and IEC 61730), which include weather tests (UV irradiation, damp heat, temperature cycling), but also hail impact test and tests of the electric insulation performance.

Module finishing accounts for 30% of the total cost for photovoltaic modules, which is a relatively large proportion. This large proportion of module fabrication is due to high material costs (including for the encapsulating material, frame, backside multilayer sheet) and long process times, i.e., low productivity. The above described individual layers of the module composite are frequently still manually assembled and oriented. In addition, the relatively slow melting of the EVA hot-melt adhesive and the lamination of the module composite at about 150° C. under vacuum cause cycle times of about 20 to 30 minutes per module.

Due to the relatively thick front glass sheet, conventional solar modules additionally have a high weight, which in turn necessitates stable support constructions, which are expensive. Also, the problem of heat dissipation is unsatisfactorily solved in current solar modules. Upon full solar irradiation, the modules will heat up to 80° C., which results in a temperature-induced deterioration of the solar cell efficiency and thus ultimately in solar electricity becoming more expensive.

In the prior art, solar modules are mainly used with a frame of aluminum. Although aluminum is a light metal, its weight contributes substantially to the total weight. Just with larger modules, this is a drawback that requires expensive support and attachment constructions.

In order to prevent the ingress of water and oxygen, said aluminum frames have an additional seal on their interior side facing towards the solar module. In addition, there is another disadvantage in that aluminum frames are prepared from rectangular profiles, so that their shapes are severely limited.

To reduce the solar module weight, to avoid an additional sealing material and to increase the freedom of design, U.S. Pat. No. 4,830,038 and U.S. Pat. No. 5,008,062 describe the provision of a plastic frame around the corresponding solar module, the frame being obtained by the RIM (reaction injection molding) process.

Preferably, the polymeric material employed is an elastomeric polyurethane. Said polyurethane preferably has a modulus of elasticity within a range of from 200 to 10,000 psi (corresponding to about 1.4 to 69.0 N/mm$^2$).

Various possibilities for reinforcing the frame are described in these two patent specifications. Thus, reinforcing components made of, for example, a polymeric material, steel or aluminum can be integrated with the frame when the latter is formed. Also, fillers can be included in the frame material. These may be, for example, plate-like fillers, such as the mineral wollastonite, or acicular/fibrous fillers, such as glass fibers.

Similarly, DE 37 37 183 A1 also describes a process for the preparation of the plastic frame of a solar module, the Shore hardness of the material employed preferably being adjusted to ensure a sufficient rigidity of the frame and an elastic accommodation of the solar generator.

DE 10 2005 032 716 A1 describes flexible solar modules in which the frame has a permanently elastic flexible consistency. It is necessary to adjust the rigidity of the plastic material low and to substantially dispense with fillers, so that the frame itself remains flexible.

Due to the different coefficients of thermal expansion of polyurethane and glass and due to the significant shrinkage of the polyurethane systems, delaminations and ingress of moisture into the interior region of the solar module occurred again and again in the past, which ultimately resulted in the module being destroyed.

Solar modules inserted in roof constructions must meet the requirements of DIN 4102-7 in accordance with the German Building Code. In particular, they must prove their resistance against flying sparks and radiant heat.

In view of these drawbacks of the prior art, a solar module should have a sufficient long term stability which prevents delaminations and/or the ingress of moisture from occurring. Such a solar module should be able to be handled without problems. For this purpose, it should have a sufficient rigidity, but not too low of an elongation at break in order that it is not destroyed immediately upon a low impact stress (for example, from edge chipping when being mounted on a building site). Further, such a solar module should have sufficient flame retardancy.

SUMMARY OF THE INVENTION

In a first aspect of the invention, a photovoltaic solar module has a wholly or partly surrounding frame of polyurethane, and the frame is characterized by having an elongation at break of at least 50%;
a modulus of elasticity of at least 30 N/mm$^2$; and
a coefficient of thermal expansion of up to $\alpha=80\times10^{-6}$/K;
the modulus of elasticity and the coefficient of thermal expansion each being measured parallel to the edges of the module.

The above described measured values of the modulus of elasticity and the coefficient of expansion are measured in the fiber direction if anisotropic fillers are partially or wholly used. When the frame mold is filled with the still liquid polyurethane, anisotropic fillers (for example, fibers) will orient themselves parallel to the module edges in accordance with the direction of flow. Transverse to the fiber direction (and to the edges), the coefficient of expansion is larger, and the modulus of elasticity is lower, which is without relevance.

It has surprisingly been found that a photovoltaic solar module having such a frame combines in itself the desired properties by a combination of these three macroscopic properties (elongation at break, modulus of elasticity, coefficient of thermal expansion:

Due to its sufficiently high modulus of elasticity, such a frame has a sufficiently high stability or rigidity. Therefore, it is preferred if the frame has a modulus of elasticity of at least 40 N/mm$^2$, more preferably at least 60 N/mm$^2$, even more preferably at least 70 N/mm$^2$, each measured parallel to the module edge.

Due to a sufficiently high rigidity, the frame and thus the solar module is essentially non-flexible, in particular, it is not rollable as described in DE 10 2005 032 716 A1. Due to this fact, it is easily handled and will not slack even after an extended period of time (for example, when applied at a distance to non-vertical surfaces).

However, the modulus of elasticity alone is not sufficient to sufficiently describe the frame comprising polyurethane. Thus, for example, many polyurethane materials also have a modulus of elasticity of at least 30 N/mm$^2$, measured parallel to the module edge, but are unsuitable because they are too brittle, i.e., non-elastic. Namely in these cases, an impact stress acting on the solar module would be transmitted unobstructed to the actual solar module in the interior of the frame, which can very easily lead to damage (breakage, cracking or the like).

Another aspect of the present invention is edge protection. Brittle materials with low elongations at break will break or splinter. Therefore, elastic materials having a higher elongation at break are more suitable for mounting in the harsh environment of a building site. For this reason, the frame should be characterized by as high an elongation at break as possible. Particularly preferred is an elongation at break of at least 80%, more preferably an elongation at break of at least 100%.

Even with these two macroscopic quantities, the solar module or its frame would be insufficiently described. In addition, the coefficient of thermal expansion of the frame should not exceed a particular maximum value, or that the coefficient of thermal expansion of the frame differs as little as possible from the coefficient of thermal expansion of the material used to cover the solar cells (usually one or more sheets of glass); since the latter is preferably very low, a maximum upper limit to the coefficient of thermal expansion of the frame results. Therefore, it is particularly preferred for it to have values of only up to $\alpha=50\times10^{-6}$/K, measured parallel to the module edge.

When an anisotropic fibrous reinforcing material is used, the coefficient of thermal expansion is low only in the direction of the fibers. In a surrounding frame, the low coefficient of thermal expansion is found parallel to the glass edge due to the orientation of the fibers. In a transverse direction thereto, the coefficient of thermal expansion is that of the non-reinforced material of about $150\times10^{-6}$/K.

Due to its particular properties, especially the elasticity of the polyurethane-comprising frame, the solar module does not need an additional seal between the frame and the solar module enclosed by it (although an additional seal for extreme weather conditions may of course be provided). To improve adhesion, an adhesion primer can be applied to the glass or the backside construction or the backside sheet.

The solar module shows sufficient resistance against delamination and ingress of moisture. This is ensured by the combination of a frame material meeting particular macroscopic quantities.

The frame of the solar module usually not only serves for sealing the solar module towards the exterior and for increasing its stability. Rather, the attachment of the solar module to the respective substrate (for example, house roofs or walls) is also effected through the frame. Therefore, the solar module can comprise, for example, fixing means, recesses and/or holes through which attachment to the respective substrate can be effected. Further, the frame can accommodate the electric connecting elements. In this case, the later mounting of a junction box can be omitted.

Further, the frame of the solar module preferably has a density of at least 800 kg/m$^3$, especially at least 1000 kg/m$^3$. Such densities, which are stated as being preferred, express the fact that the frame is preferably not a foam material, but preferably a solid material that has no or, if any, extremely few gas inclusions. This is favorable not only to the stability of the frame, but also to its tightness.

Further, it is possible that the frame of the solar module contains isotropic and/or anisotropic fillers, anisotropic and especially acicular and/or fibrous fillers being particularly preferred.

Accordingly, an improved photovoltaic solar module is disclosed. Advantages of the improvements will appear from the drawings and the description of the preferred embodiment.

DETAILED DESCRIPTION OF THE PREFERRED EMBODIMENTS

As used herein, "fillers" means organic and/or inorganic compounds, preferably organic and/or inorganic compounds except for
- a) organic compounds that are halogenated, contain phosphorus or nitrogen and
- b) inorganic phosphorus compounds, inorganic metal hydroxides and inorganic boron compounds.

As used herein, the groups of compounds listed under a) and b) are preferably included with the flame retardants. The advantage of anisotropic fillers resides in their orientation and the particularly low thermal expansion and shrinkage values caused thereby. Good properties are achieved if:
1) the fibers are oriented parallel to the direction of stress (e.g., parallel to the edges);
2) the fibers have a large ratio of length/diameter (the more anisotropic, the better is the reinforcement in the direction of the fibers);
3) a size permanently ensures the fiber-matrix contact.

The amount of the fillers contained in the frame is preferably within a range of from 10 to 30% by weight, more preferably within a range of from 15 to 25% by weight, based on the weight of the polyurethane. Within these ranges, the macroscopic quantities judged to be important above take particularly favorable values.

High reinforcement contents in filled polyurethanes can be prepared, for example, by a fiber spray process or the so-called S-RIM process (S=structural) in addition to the R-RIM process. In fiber spraying, a fiber-polyurethane mixture is sprayed to the desired site in the mold. Subsequently, the mold is closed, and the PUR system reacts to completion. In the S-RIM process, a preformed (continuous) fibrous structure is inserted in the (frame) mold, and then the PUR reactive mixture is injected into the still open or already closed mold. In this way too, high moduli of elasticity and lower coefficients of thermal expansion can be achieved.

Further, the preparation of a frame with high fiber contents is possible according to the RTM (resin transfer molding) process, in which again a fibrous structure inserted in a mold is soaked with the aid of vacuum.

For lower filler contents, there is a risk that the macroscopic properties of the frame are not reached as things stand at present.

Preferably, the fillers are synthetic or natural, especially mineral, fillers. More preferably, the fillers are selected from the following group: mica, plate-like and/or fibrous wollastonite, glass fibers, carbon fibers, aramide fibers or mixtures thereof. Among these fillers, fibrous wollastonite is preferred because it is inexpensive and readily available.

Preferably, the fillers additionally have a coating, especially an aminosilane-based coating. In this case, the interaction between the fillers and the polymer matrix is enhanced. This results in better performance characteristics since the coating permanently couples the fibers to the polyurethane matrix.

Preferably, the frame of the solar module comprises at least one flame retardant. "Flame retardants", as used herein, means, in particular, organic compounds (especially halogenated, phosphor-containing, such as tricresyl phosphate, tris(2-chloroethyl) phosphate, tris(chloropropyl) phosphate and tris(2,3-dibromopropyl) phosphate, and nitrogen-containing organic compounds) and inorganic phosphorus compounds (for example, red phosphor, ammonium polyphosphate), inorganic metal hydroxides (for example, aluminum trihydroxide, aluminum oxide hydrate, ammonium polyphosphate, sodium polymetaphosphate or amine phosphates, such as melamine phosphates) and inorganic boron compounds (for example, boric acid, borax).

Examples of commercially available flame retardants that may be employed include, for example: Disflamoll® DPK (diphenyl cresyl phosphate), Levagard® DMPP (dimethyl propanephosphonate), Levagard® PP (tris(2-chloroisopropyl) phosphate), melamine, Exolit® AP 422 (a free flowing powdery, hardly water-soluble ammonium polyphosphate of formula $(NH_4PO_3)_n$ with n=20 to 1000, especially from 200 to 1000), Apyral® $(Al(OH)_3)$.

Melamine is particularly preferred as a flame retardant.

Preferably, the frame of the solar module comprises both fillers and flame retardants. The presence of these two ingredients results in sufficient mechanical properties (elongation at break, modulus of elasticity and coefficient of thermal expansion, see above), the solar module at the same time exhibiting sufficient flame-retardant properties, which is required, for example, for use as a roof module.

For the ratio of fillers to flame retardants, two alternatives have proven particularly preferred:
- a) The frame of the solar module comprises fillers in an amount of from 10 to 15% by weight and flame retardants in an amount of from 10 to 15% by weight.
- b) The frame of the solar module comprises fillers in an amount of from 10 to 20% by weight and flame retardants in an amount of from 5 to 7% by weight.

The slightly higher proportion of fillers in alternative b) results in slightly better mechanical properties as compared to alternative a), but at the cost of the flame retardant properties of the frame surrounding the solar module. Therefore, it is further preferred that the frame comprises an exterior flame-retardant layer, especially in alternative b). The exterior flame-retardant layer or its chemical precursor is preferably applied to the frame of the solar module or charged into a mold in which the solar module is subsequently prepared (the latter alternative is also referred to as the so-called in-mold coating method).

The exterior flame-retardant layer preferably has a thickness within a range of from 0.01 to 0.06 mm. Thicknesses within a range of from 0.03 to 0.06 mm are more preferred. Below this range, the flame-retardant properties of the exterior flame-retardant layer are not sufficient. Greater layer thicknesses are accompanied by higher production costs.

In a second embodiment, a process for the preparation of a solar module with a frame is characterized in that said frame is formed by RIM, R-RIM, S-RIM, RTM, spraying or casting.

Due to the preparation method employed, it may occur that the above discussed macroscopic quantities are not necessarily constant over the frame (for example, a higher density might result in one portion as compared to another). In this context, the upper and lower limits discussed here are to be understood in such terms that they are not exceeded or fallen short of, respectively, on average throughout the frame.

Just when fibrous fillers are used, it was found in the course of the preparation of the frame by the R-RIM method that the macroscopic quantities are not constant over the frame, because due to the kind of process, a particular preferential direction of the fibers arises when the composition flows into the mold, and the macroscopic quantities depend on the orientation of the fibrous fillers in the polymer matrix.

In the preparation of the solar module frames from polyurethane, polyisocyanates are employed. The polyisocyanates employed are (cyclo)aliphatic or aromatic polyisocyanates. Preferably, they are toluoylene diisocyanate, di- and/or polyisocyanates of the diphenylmethane series having an NCO content of from 28 to 50% by weight. These include mixtures of 4,4'-diisocyanatodiphenylmethane with 2,4'-diisocyanatodiphenylmethane and optionally to a low extent 2,2'-diisocyanato-diphenylmethane that are liquid at room temperature or, if necessary, have been correspondingly modified. Polyisocyanate mixtures of the diphenylmethane series that are liquid at room temperature and contain, in addition to the mentioned isomers, their higher homologues are also very suitable and are available in a per se known manner by the phosgenation of aniline/formaldehyde condensates. Modification products of these di- and polyisocyanates having urethane or carbodiimide groups and/or allophanate or biuret groups are also suitable. NCO prepolymers having an NCO content of from 10 to 48% by weight are also suitable. They are prepared from the above mentioned polyisocyanates and polyether polyols having a hydroxyl number of 6 to 112, polyoxyalkylene diols having a hydroxyl number of 113 to 1100, or alkylene diols having a hydroxyl number of 645 to 1850, or mixtures thereof.

To form the polyurethane, aromatic isocyanate components based on MDI (diphenylmethane diisocyanate) are preferably employed, NCO prepolymers being more preferably employed.

In the preparation of the solar module frames from polyurethane, polyol formulations are additionally employed. In addition to at least one polyhydroxy compound, these also contain chain extenders, catalysts, fillers, auxiliaries and additives.

The polyhydroxy compounds are preferably polyhydroxypolyethers, which may be prepared in a per se known manner by the polyaddition of alkylene oxides to polyfunctional starting compounds in the presence of catalysts. Preferably, the polyhydroxypolyethers are prepared from a starting compound having on average 2 to 8 active hydrogens, and one or more alkylene oxides. Preferred starting compounds are molecules having two to eight hydroxy groups per molecule, such as water, ethylene glycol, propylene glycol, diethylene glycol, dipropylene glycol, triethylene glycol, tripropylene glycol, 1,4-butanediol, 1,6-hexanediol, triethanolamine, glycerol, trimethylolpropane, pentaerythritol, sorbitol and saccharose. The starting compounds may be used alone or in admixture. The polyols are prepared from one or more alkylene oxides. Preferably used alkylene oxides are oxirane, methyloxirane and ethyloxirane. These may be used alone or in admixture. When used in admixture, it is possible to react the alkylene oxides in a random and/or block fashion. Also suitable are those higher molecular weight polyhydroxypolyethers in which high molecular weight polyadducts or polycondensates or polymerizates in a finely disperse, dissolved or grafted form. Such modified polyhydroxy compounds are obtained, for example, if polyaddition reactions (e.g., reactions between polyisocyanates and amino-functional compounds) or polycondensation reactions (e.g., between formaldehyde and phenols and/or amines) are performed in situ in the compounds having hydroxy groups (as described, for example, in DE-AS 1 168 075). Polyhydroxy compounds modified by vinyl polymers as obtained, for example, by the polymerization of styrene and acrylonitrile in the presence of polyethers (e.g., according to U.S. Pat. No. 3,383,351) are also suitable as polyhydroxypolyol component for the process. Representatives of the mentioned polyol component are described, for example, in the Kunststoff-Handbuch, Volume VII "Polyurethane", 3rd Edition, Carl Hanser Verlag, Munich/Vienna, 1993, pages 57-67 or pages 88-90. One or more polyhydroxypolyethers having a hydroxyl number of from 6 to 112, preferably from 21 to 56, and a functionality of from 1.8 to 8, preferably from 1.8 to 6, are preferably employed as a polyhydroxypolyol component.

Suitable as chain extenders in the polyol formulation are those whose average hydroxyl or amine number is from 245 to 1850 and whose functionality is from 1.8 to 8, preferably from 1.8 to 4. As examples, there may be mentioned ethylene glycol, propylene glycol, diethylene glycol, dipropylene glycol, 1,4-butanediol, 1,6-hexanediol, triethanolamine, glycerol, trimethylolpropane and short-chained alkoxylation products. Ethylene glycol and 1,4-butanediol are more preferably employed.

The reaction between isocyanate and hydroxy groups, which proceeds slowly as such, can be accelerated by adding one or more catalysts. Suitable catalysts include, in particular, tertiary amines of the per se known kind, for example, triethylamine, tributylamine, N-methylmorpholine, N-ethylmorpholine, N-cocomorpholine, N,N,N$^1$,N$^1$-tetramethylethylenediamine, 1,4-diazabicyclo[2.2.2]octane, N-methyl-N'-dimethylaminoethylpiperazine, N,N-dimethylcyclohexylamine, N,N,N',N'-tetramethyl-1,3-butanediamine, N,N-dimethylimidazole-p-phenylethylamine, 1,2-dimethylimidazole, bis(2-dimethylaminoethyl)ether or 2-methylimidazole. Also, organic metal catalysts, such as organic bismuth catalysts, for example, bismuth (III) neodecanoate, or organic tin catalysts, for example, tin (II) salts of carboxylic acids, such as tin (II) acetate, tin (II) octoate, tin (II) ethylhexanoate and tin (II) laurate, and the dialkyltin salts of carboxylic acids, for example, dibutyltin diacetate, dibutyltin dilaurate, dibutyltin maleate or dioctyltin diacetate, may be used alone or in combination with the tertiary amines. The catalysts may be used alone or in combination. Further representatives of catalysts and details about the mode of action of the catalysts are described in the Kunststoff-Handbuch, Volume VII "Polyurethane", 3rd Edition, Carl Hanser Verlag, Munich/Vienna, 1993, on pages 104-110.

Fillers, which are optionally to be included, may be both inorganic and organic fillers. As examples of inorganic fillers, there may be mentioned: plate-like and/or fibrous wollastonite, silicate minerals, such as sheet silicates (e.g., mica), metal oxides, such as iron oxides, pyrogenically prepared metal oxides, such as aerosils, metal salts, such as baryte, inorganic pigments, such as cadmium sulfide, zinc sulfide, as well as glass, glass fibers, glass microspheres, glass bubbles and the like. As examples of organic fillers, there may be mentioned: organic fibers (such as carbon and/or aramide fibers), crystalline paraffins or fats, powders based on polystyrene, polyvinyl chloride, urea-formaldehyde compositions and/or polyhydroazodicarbonamides (e.g., from hydrazine and toluoylene diisocyanate). Microbubbles of organic origin or cork may also be employed. The organic or inorganic fillers may be used singly or as mixtures.

The auxiliaries and additives which may optionally be included in the polyol formulation include, for example, foaming agents, stabilizers, coloring agents, flame retardants, plasticizers and/or monohydric alcohols.

Both physical foaming agents and water may be used as foaming agents. Physical foaming agents include, for example, 1,1,1,3,3-pentafluoropropane, n-pentane and/or i-hexane. Water is preferably employed. The foaming agents may be employed alone or in combination.

As stabilizers, there are employed, in particular, surface-active substances, i.e., compounds that serve to support the homogenization of the starting materials and are optionally also suitable to regulate the cellular structure of the plastic materials. There may be mentioned, for example, emulsifiers, such as the sodium salts of the castor oil sulfates or fatty acids and salts of fatty acids with amines, foam stabilizers, such as siloxane-oxyalkylene mixed polymers, and cell regulators, such as paraffins. Organopolysiloxanes, which are water-soluble, are predominantly employed as stabilizers. These are polydimethylsiloxane residues to which a polyether chain of ethylene oxide and propylene oxide is grafted.

As coloring agents for the coloring of polyurethanes, per se known dyes and/or color pigments, organically and/or inorganically based, for example, iron oxide and/or chromium oxide pigments and phthalocyanine- and/or monoazo-based pigments may be employed.

"Flame retardants", as used herein, means, in particular, organic compounds (especially halogenated, phosphor-containing, such as tricresyl phosphate, tris(2-chloroethyl) phosphate, tris(chloropropyl) phosphate and tris(2,3-dibromopropyl) phosphate, and nitrogen-containing organic compounds) and inorganic phosphorus compounds (for example, red phosphor, ammonium polyphosphate), inorganic metal hydroxides (for example, aluminum trihydroxide, aluminum oxide hydrate, ammonium polyphosphate, sodium polymetaphosphate or amine phosphates, such as melamine phosphates) and inorganic boron compounds (for example, boric acid, borax).

Examples of commercially available flame retardants that may be employed include, for example: Disflamoll® DPK (diphenyl cresyl phosphate), Levagard® DMPP (dimethyl propanephosphonate), Levagard® PP (tris(2-chloroisopropyl) phosphate), melamine, Exolit® AP 422 (a free flowing powdery, hardly water-soluble ammonium polyphosphate of formula $(NR_4PO_3)_n$, with n=20 to 1000, especially from 200 to 1000), Apyral® $(Al(OH)_3)$.

Melamine is particularly preferred as a flame retardant.

As plasticizers, there may be mentioned, for example, esters of polyvalent, preferably divalent, carboxylic acids with monohydric alcohols. The acid component of such esters may be derived, for example, from succinic acid, isophthalic acid, trimellithic acid, phthalic anhydride, tetra- and/or hexahydrophthalic anhydride, endo-methylenetetrahydrophthalic anhydride, glutaric anhydride, maleic anhydride, fumaric acid and/or dimeric and/or trimeric fatty acids, optionally in admixture with monomeric fatty acids. The alcohol component of such esters can be derived, for example, from branched and/or unbranched aliphatic alcohols having from 1 to 20 carbons, such as methanol, ethanol, propanol, isopropanol, n-butanol, sec-butanol, tert-butanol, the various isomers of pentyl alcohol, hexyl alcohol, octyl alcohol (e.g., 2-ethylhexanol), nonyl alcohol, decyl alcohol, lauryl alcohol, myristyl alcohol, cetyl alcohol, stearyl alcohol and/or from fatty and waxy alcohols that are naturally occurring or obtainable by the hydrogenation of naturally occurring carboxylic acids. Cycloaliphatic and/or aromatic hydroxy compounds, for example, cyclohexanol and its homologues, phenol, cresol, thymol, carvacrol, benzyl alcohol and/or phenylethanol, are also suitable as alcohol component. In addition, esters of the above mentioned alcohols with phosphoric acid are suitable as plasticizers. Optionally, phosphate esters of halogenated alcohols, such as trichloroethyl phosphate, may also be employed. In the latter case, a flame retardant effect can be achieved along with the plasticizing effect. Of course, mixed esters of the above mentioned alcohols and carboxylic acids may also be employed. The plasticizers may also be so-called polymeric plasticizers, for example, polyesters of adipic, sebacic and/or phthalic acid. Further, alkylsulfonate esters of phenol, for example, paraffinsulfonic acid phenyl ester, can also be used as plasticizers.

Further auxiliaries and/or additives that may be included are monohydric alcohols, such as butanol, 2-ethylhexanol, octanol, dodecanol or cyclohexanol, which may be included to bring about a desired chain termination. Further information about the usual auxiliaries and additives can be seen from the pertinent literature, for example, the Kunststoff-Handbuch, Volume VII "Polyurethane", 3rd Edition, Carl Hanser Verlag, MunichNienna, 1993, pages 104ff.

The exterior flame retarding layer can be applied later to the frame of the solar module. However, it may also be charged into a mold in which the actual solar module is subsequently prepared. The charging of a (lacquer) layer in a mold followed by closing the mold and injection of the actual plastic material is also referred to as a so-called in-mold coating method. Possible compositions of such in-mold coating lacquers are disclosed, for example, in DE 38 21 908 C1 and U.S. Pat. No. 5,567,763.

In a third embodiment, a device for generating electric power comprises the photovoltaic solar module with the above defined physical properties of the frame.

EXAMPLES

The following Examples illustrate the preparation of frame materials of different compositions and the comparison between them.

Example 1

This example represents an embodiment of the invention (hereinafter referred to as "Example"). With the R-RIM methods, plate-shaped Bayflex® molded parts were prepared on a laboratory piston filling machine.

The Bayflex® system Bayflex® VP.PU 51BD11/Desmodur VP.PU 181F18 with 20% by weight (based on the finished polyurethane elastomer) of a fibrous wollastonite reinforcing material of the type Tremin 939.955 supplied by Quarzwerke, Frechen, Germany, was employed.

The plates had the dimensions 200×300×3 mm³. From these plates, standard specimens were punched out in accordance with the respective testing standards. The following material properties were determined:

| | | |
|---|---|---|
| Density: | 1.25 g/cm3 | DIN EN ISO 845 |
| Tensile modulus of elasticity: (in the direction of the fibers*) | 64 N/mm2 | DIN EN ISO 37 |
| Tensile modulus of elasticity: (transverse to the direction of the fibers**) | 44 N/mm2 | DIN EN ISO 37 |
| Elongation at break: (in the direction of the fibers*) | 320% | DIN EN ISO 37 |
| Elongation at break: (transverse to the direction of the fibers**) | 350% | DIN EN ISO 37 |

-continued

| | | |
|---|---|---|
| Shrinkage: (in the direction of the fibers*) | 0.4% | (measured by analogy with ISO 294-4) |
| Shrinkage: (transverse to the direction of the fibers**) | 1.0% | (measured by analogy with ISO 294-4) |
| Coefficient of thermal expansion: (in the direction of the fibers*) | $40 \times 10{-6}/K$ | DIN 53752 |
| Coefficient of thermal expansion: (transverse to the direction of the fibers**) | $160 \times 10{-6}/K$ | DIN 53752 |

*parallel to the edge of the module
**vertical to the edge of the module

Comparative Examples

These are comparative examples only (hereinafter referred to as "Comparative Example"), and do not represent embodiments of the invention.
a) Solid unfilled elastomer
Bayflex® VP.PU 81BD03/Desmodur 0833 from BMS AG

| | | |
|---|---|---|
| Density: | 1.13 g/cm3 | DIN EN ISO 845 |
| Tensile modulus of elasticity: | 21 N/mm2 | DIN EN ISO 37 |
| Elongation at break: | 200% | DIN EN ISO 37 |
| Shrinkage: | 1.7% | (measured by analogy with ISO 294-4) |
| Coefficient of thermal expansion: | $190 \times 10{-6}/K$ | DIN 53752 |

Comparative Example a) is not suitable as a frame material, since the polyurethane has too high a coefficient of thermal expansion, in particular.
b) Microcellular hard RIM material Baydur® 110 (Baydur® VP.PU 1498 Desmodur® VP.PU 26lk01, processed without filler/reinforcement) from Bayer MaterialScience AG.

| | | |
|---|---|---|
| Density: | 1.10 g/cm3 | DIN 53479 |
| Tensile modulus of elasticity: | 1700 N/mm2 | DIN 53455 |
| Elongation at break: | 14% | DIN 53455 |
| Shrinkage: | 0.5-0.8% | (measured by analogy with ISO 294-4) |
| Coefficient of thermal expansion: | $90 \times 10{-6}/K$ | DIN 53752 |

Comparative Example b) is not suitable as a frame material, since the polyurethane has too low an elongation at break, in particular.

The following Examples and Comparative Examples illustrate the preparation of frame materials of different compositions and their performance in different fire tests.

Plate-shaped Bayflex® molded parts were prepared by the R-RIM method. Further, polyurethane frames with the same materials were injection-molded around glass laminates. The glass laminates were solar glass sheets with a sheet composite bonded to the backside, which mimics real photovoltaic elements and thus served for the simulation of a real solar module. With the molded plates and the solar module models, mechanical tests and fire tests were performed. The results are summarized in Table 1.

The Bayflex® system Bayflex° VP.PU 51BD11/Desmodur° VP.PU 181F18 was employed as an Example and Comparative Example, and the Bayflex® system Bayflex® VP.PU 81 BD03/Desmodur® VP.PU 0833 with different proportions of reinforcement and flame retardant materials was employed as a Comparative Example. Fibrous wollastonite of the type Tremin 939.955 from the company Quarzwerke, Frechen, was used as a reinforcement material. As a flame retardant, there was employed, on the one hand, finely crystalline powdery melamine (2,4,6-triamino-1,3,5-triazine) from BASF AG. On the other hand, an in-mold coating lacquer that at the same time has a flame retardant function was employed. The product bomix PUR-IMC VP 5780006 was used together with the hardener 27/77 from the company bomix Chemie GmbH, Telgte, Germany.

The molded plates were prepared with the amounts of reinforcement material and flame retardant as stated in the Table (percent by weight, based on the weight of the molded part) and had the dimensions $200 \times 300 \times 4$ mm$^3$.

When the in-mold coat was applied, the release agent bomix LC7/A9807-7 from the company bomix Chemie GmbH, Telgte, Germany, was at first sprayed onto the open mold. Subsequently, a layer of lacquer (consisting of 100 parts of bomix PUR-IMC VP 5780006 and 25 parts of hardener 27/77) was uniformly sprayed onto the mold walls using a spray gun FSP-FP-HTE 1,5 from the company Schneider Druckluft GmbH, Reutlingen, Germany. After a venting time of 30 seconds, the mold was closed, and the reactive polyurethane mixture was injected by a high-pressure piston filling machine. According to the safety data sheet from the company bomix GmbH, the in-mold coat employed was a polyurethane resin provided with inorganic pigments and dissolved in esters, the applicable lacquer comprising the following compounds, among others: about 47% butyl acetate, about 10% triethyl phosphate, about 6% 2,5-pentanedione and about 5% methoxypropyl acetate (in % by weight).

A lacquer layer thickness of 0.03 mm was realized on the molded plates and further also on the solar module frames.

From the molded plates, standard specimens were punched out in accordance with the respective testing standards. The determination of the tensile modulus of elasticity and the elongation at break, both in the direction of the fibers, was performed according to DIN EN ISO 37.

The fire test on strip-shaped specimens obtained from the molded plates was performed by analogy with the standard UL 94. UL 94 is a common preliminary test by means of which materials can be characterized in terms of their fire behavior. What was measured was the after-flame time after a flame had been applied to the specimen for 10 seconds and then removed. A flame was applied twice in each case. The object is to reach an after-flame time of less than 10 seconds.

When the solar module frames were prepared, an analogous procedure was used. The solar module models had lateral dimensions of $1300 \times 800$ mm$^2$ with a laminate thickness of 6 mm. The surrounding polyurethane frame had an average thickness of 12 mm.

On the thus prepared solar module models, fire tests were performed by analogy with DIN 4102-7. Thus, two solar module models were screwed onto a metallic scaffold side by side at an angle of 45°, and an incendiary mixture according to the standard was placed onto the horizontal and vertical frame regions. The flame retardancy was classified in terms of the vertical and horizontal fire propagation starting from the incendiary mixture by analogy with DIN EN 13501-5. The object is as low as possible a fire propagation in the horizontal and vertical directions.

TABLE 1

|  | Polyurethane system | Content of reinforcing material [% by weight] | Content of flame retardant [% by weight] | Fire test molded plate by analogy with UL 94 1st after-flame time 2nd after-flame time | Fire test solar module frames by analogy with DIN 4102-7 fire propagation horizontal fire propagation vertical | Tensile test DIN EN ISO 37 Tensile modulus of elasticity [N/mm²] in direction of fibers | Elongation at break [%] in direction of fibers | Thermal expansion Alpha [$10^{-6}$/K] DIN 53752 in direction of fibers | Density [g/cm³] DIN EN ISO 845 |
|---|---|---|---|---|---|---|---|---|---|
| Comp. Example | Bayflex ® VP.PU 81BD03-Desmodur ® VP.PU 0833 | 20% Tremin 939.955 | none | >10 s<br>>10 s | test not performed | 44 | 150 | 56 | 1.27 |
| Comp. Example | Bayflex ® VP.PU 51BD11-Desmodur ® VP.PU 18IF18 | 20% Tremin 939.955 | none | >10 s<br>>10 s | 89<br>80 | 64 | 328 | 40 | 1.25 |
| Example | Bayflex ® VP.PU 51BD11-Desmodur ® VP.PU 18IF18 | 12.5% Tremin 939.955 | 12.5% melamine | <1 s<br><1 s | 0<br>5 | 48 | 284 | 74 | 1.15 |
| Comp. Example | Bayflex ® VP.PU 51BD11-Desmodur ® VP.PU 18IF18 | 18.75% Tremin 939.955 | 6.25% melamine | 2 s<br>>10 s | extinguished<br>58 | 62 | 226 | 57 | 1.15 |
| Example | Bayflex ® VP.PU 51BD11-Desmodur ® VP.PU 18IF18 | 18.75% Tremin 939.955 | 6.25% melamine + 0.03 mm in-mold coat bomix | 1 s<br>1 s | 0<br>40 | 62* | 226* | 57* | 1.15 |

*These mechanical values were adopted from the Comparative Example since it is to be considered that the properties do not change during the IMC process Thus, a photovoltaic solar module is disclosed. While embodiments of this invention have been shown and described, it will be apparent to those skilled in the art that many more modifications are possible without departing from the inventive concepts herein. The invention, therefore, is not to be restricted except in the spirit of the following claims.

What is claimed is:

1. A photovoltaic solar module having a wholly or partly surrounding frame of polyurethane, the frame being characterized by having
an elongation at break of at least 50%;
a modulus of elasticity of at least 30 N/mm²; and
a coefficient of thermal expansion of up to $\alpha=80\times10^{-6}$/K;
the modulus of elasticity and the coefficient of thermal expansion each being measured parallel to edges of the module.

2. The solar module according to claim 1, wherein the elongation at break is at least 80%.

3. The solar module according to claim 2, wherein the elongation at break is at least 100%.

4. The solar module according to claim 1, wherein the modulus of elasticity is at least 40 N/mm².

5. The solar module according to claim 4, wherein the modulus of elasticity is at least 60 N/mm².

6. The solar module according to claim 5, wherein the modulus of elasticity is at least 70 N/mm².

7. The solar module according to claim 1, wherein the coefficient of thermal expansion is up to $\alpha=50\times10^{-6}$/K.

8. The solar module according to claim 1, wherein the frame has a density of at least 800 kg/m3.

9. The solar module according to claim 8, wherein the density is at least 1000 kg/m³.

10. The solar module according to claim 1, wherein the frame contains fillers in a proportion of from 10 to 30% by weight, based on the weight of the polyurethane elastomer.

11. The solar module according to claim 10, wherein the fillers are in a proportion of from 15 to 25% by weight.

12. The solar module according to claim 1, wherein the frame includes isotropic and/or anisotropic fillers.

13. The solar module according to claim 12, wherein the fillers comprise synthetic or natural fillers.

14. The solar module according to claim 13, wherein the fillers comprise mineral fillers.

15. The solar module according to claim 12, wherein the fillers are selected from the group consisting of mica, plate-like and/or fibrous wollastonite, glass fibers, carbon fibers, aramide fibers or mixtures thereof.

16. The solar module according to claim 12, wherein the fillers have a coating.

17. The solar module according to claim 16, wherein the coating comprises an aminosilane-based coating.

18. The solar module according to claim 12, wherein the fillers are in a proportion of from 10 to 15% by weight, based on the weight of the polyurethane elastomer, and the frame includes flame retardants in an amount of from 10 to 15% by weight.

19. The solar module according to claim 12, wherein the fillers are in a proportion of from 15 to 20% by weight, based on the weight of the polyurethane elastomer, and the frame includes flame retardants in an amount of from 5 to 7% by weight.

20. The solar module according to claim 1, wherein the frame includes an exterior flame-retardant layer.

21. The solar module according to claim 20, wherein the exterior flame-retardant layer has a thickness within a range of from 0.01 to 0.06 mm.

22. The solar module according to claim 1, wherein the frame includes at least one flame retardant.

23. A process for the preparation of the solar module according to claim 1, wherein the frame is formed by RIM, R-RIM, S-RIM, RTM, spraying or casting.

24. The process according to claim 23, wherein an aromatic isocyanate component is employed to form the polyurethane.

25. The process according to claim 24, wherein the exterior flame-retardant layer is applied to the frame of the solar module or charged into a mold in which the solar module is to be prepared.

* * * * *